United States Patent [19]

Bollian

[11] 4,073,425

[45] Feb. 14, 1978

[54] METHOD OF AND APPARATUS FOR MANUFACTURING DOUBLE CONTACT RIVETS

[75] Inventor: Erwin Bollian, Rastatt, Germany

[73] Assignee: Eugen Durrwachter Doduco, Pforzheim, Germany

[21] Appl. No.: 747,044

[22] Filed: Dec. 2, 1976

[30] Foreign Application Priority Data

Dec. 11, 1975 Germany ............................ 2555697

[51] Int. Cl.$^2$ ......................... B23K 21/00; B21K 1/62

[52] U.S. Cl. .................................... 228/116; 228/3.1; 228/5.1; 228/160; 228/904

[58] Field of Search ............... 228/115, 116, 159, 160, 228/162, 179, 904, 3.1, 4.1, 5.1, 13

[56] References Cited

U.S. PATENT DOCUMENTS

| | | | |
|---|---|---|---|
| 3,026,603 | 3/1962 | Zysk | 228/115 X |
| 3,397,454 | 8/1968 | Gwyn | 228/115 X |
| 3,460,735 | 8/1969 | Shibata | 228/115 X |
| 3,600,794 | 8/1971 | Shibata | 228/115 |
| 3,634,934 | 1/1972 | Fitzgerald | 228/160 X |

FOREIGN PATENT DOCUMENTS

| | | | |
|---|---|---|---|
| 1,243,746 | 9/1960 | France | 228/115 |
| 386,212 | 12/1959 | Switzerland | 228/160 |

*Primary Examiner*—Donald G. Kelly

[57] ABSTRACT

A double-contact rivet is formed from wire portions cut from wire supplies. The wire portions are aligned so that outer portions of electric contact material are located on either side of a central portion of support material, and the two outer portions are cold-welded to the central portion. One end of the body so formed is punched to provide a contact head while the bead formed by the cold-welding at the other end is pressed to a substantially flat ring form and hardened by rapid cooling. The hardened ring bead is cleanly cut from the remainder of the rivet.

6 Claims, 10 Drawing Figures

Fig. 1
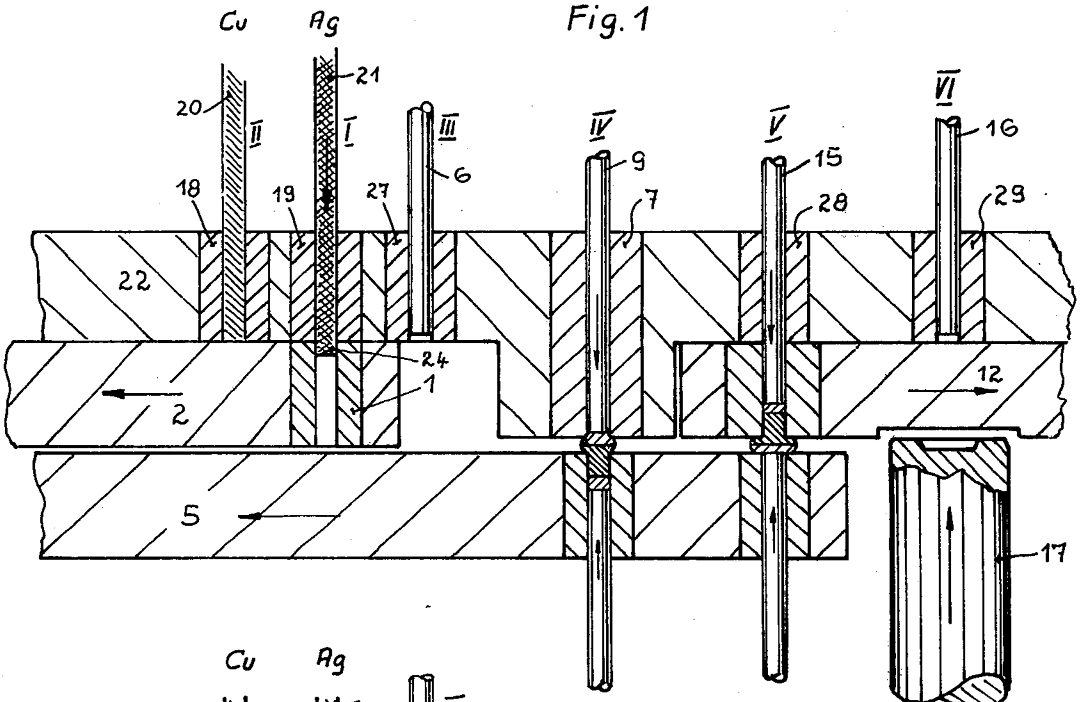
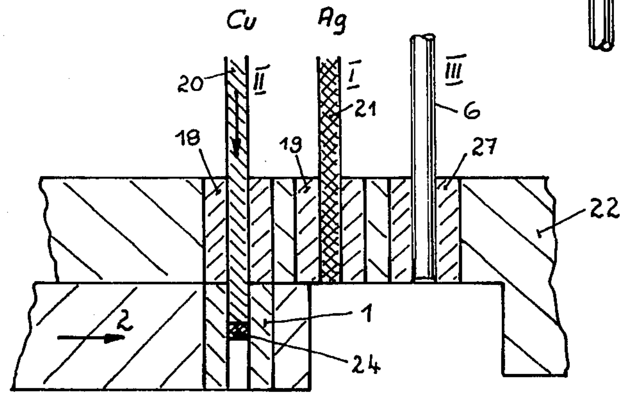
Fig. 2
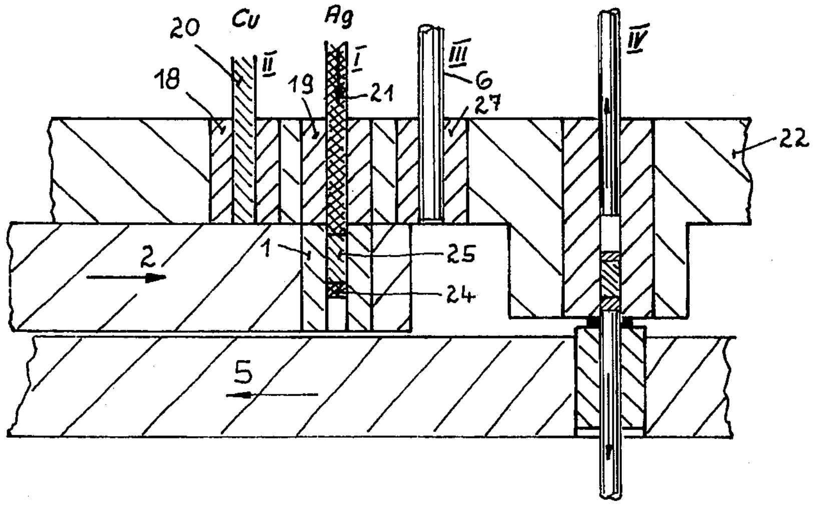
Fig. 3

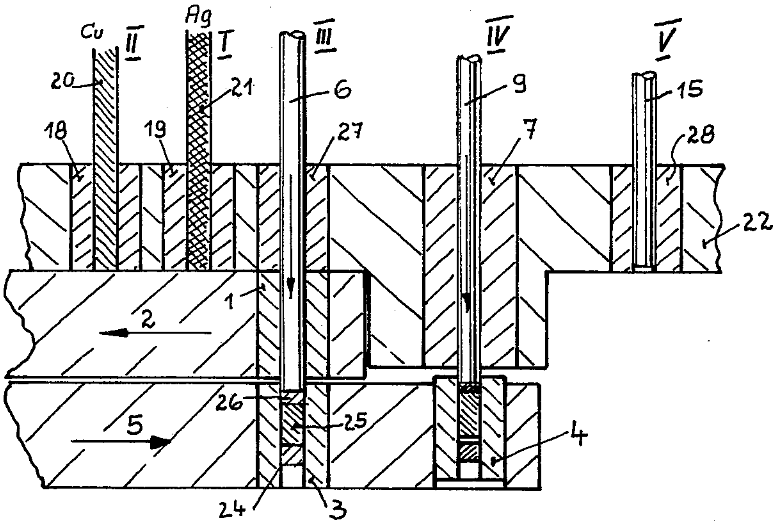
Fig. 4
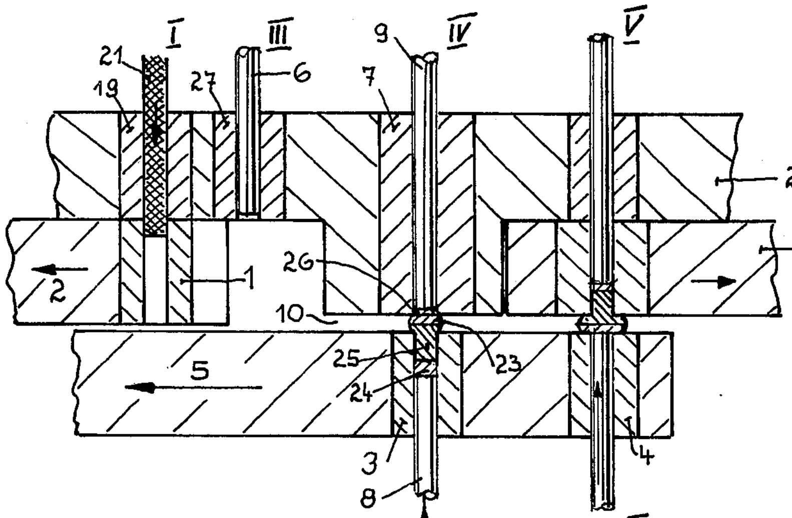
Fig. 5
Fig. 6
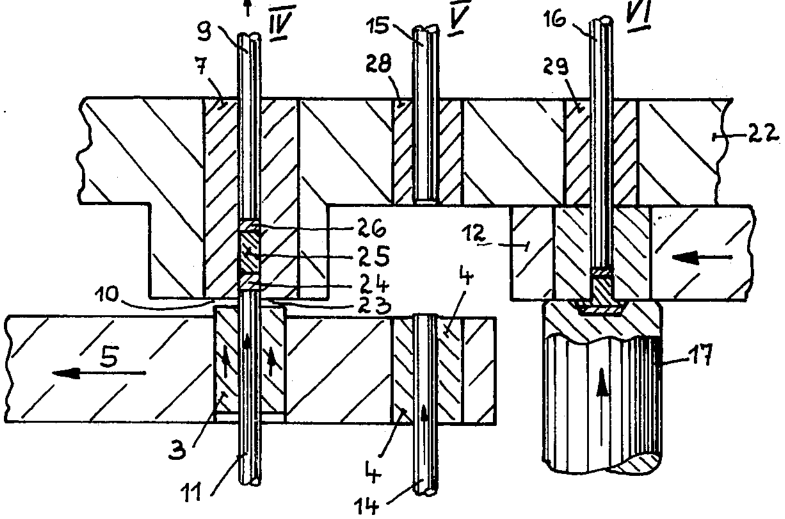

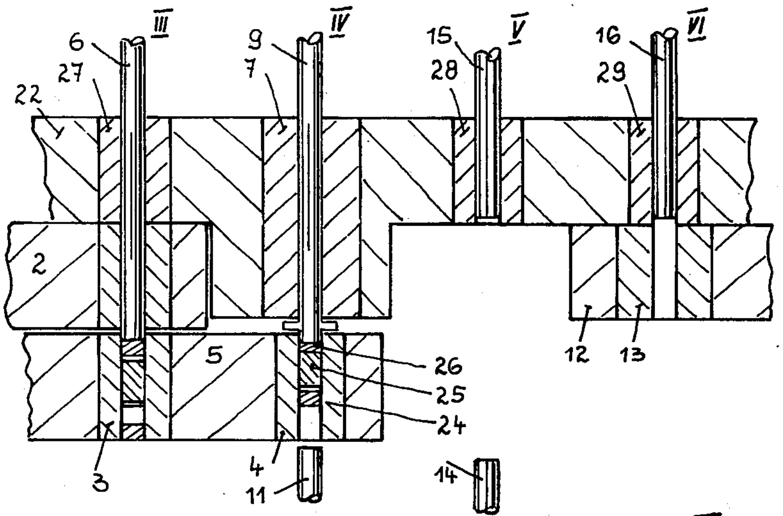
Fig.7
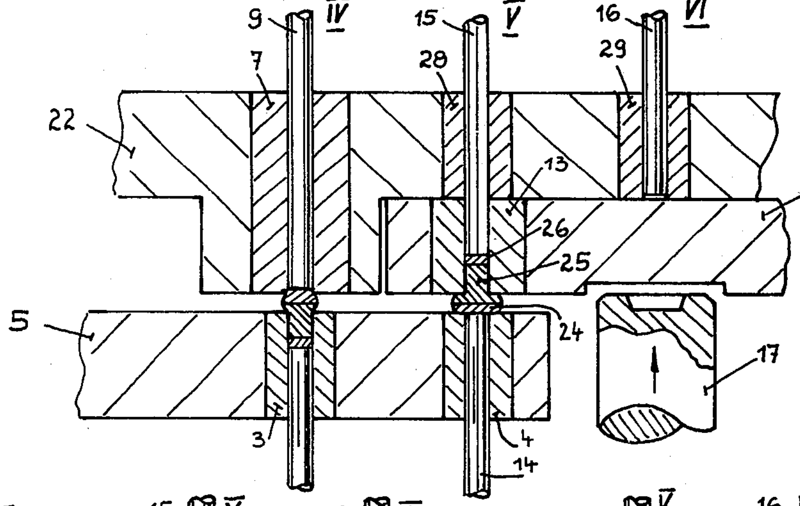
Fig.8
Fig.9
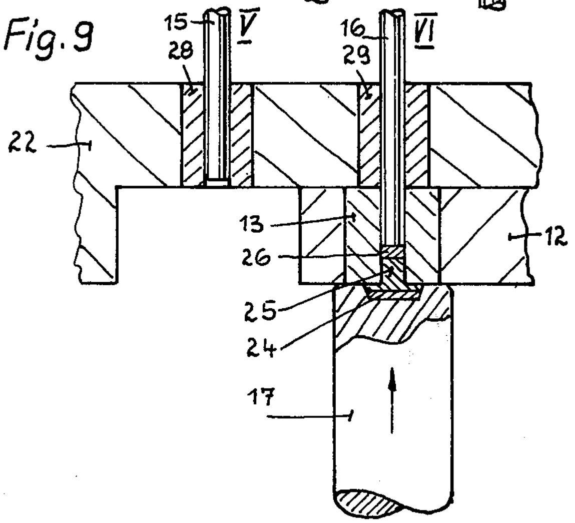
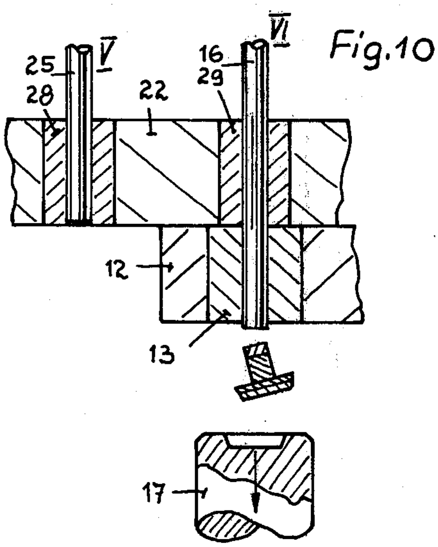
Fig.10

METHOD OF AND APPARATUS FOR MANUFACTURING DOUBLE CONTACT RIVETS

This invention relates to the manufacture of double-contact rivets consisting of a support material and different materials for the electrical contact-providing portions, and more particularly to a rivet made from wires which are cut from a wire supply and cold-welded together at the ends, a portion of the support material wire being firstly cold-welded to a portion of the contact-material wire, and the resulting annular welding bead being cut off, whereupon the second portion of contact-material wire is cold-welded to the portion of support-material wire, and a contact head is formed at a rivet end.

In cold welding, it is unavoidable that a welding bead is formed at the welding point. In the manufacture of simple bimetal contact rivets, this welding bead is utilised to form the head of the rivet. In the case of double-contact rivets, only one of the two welding beads can be used for head formation, the other bead having to be cut off the shaft of the contact rivet and removed as waste.

The welding bead resulting from stock plating of a double-contact rivet heats up through deformation of the materials at the welding point, and thus becomes plastic. If it is cut off the shaft of the contact rivet, conventionally with a stamp tool, it adheres partially over the length of the shaft, which may easily lead to clogging of the dies in which the contact rivet is located during the manufacturing process. The contact rivet cannot then be removed from the die during the operational rhythm of the machine, so that the machine must be stopped and manually cleaned. This makes efficient manufacture impossible. Machines such as that known from Swiss Patent No. 386212, i.e. a rotary table for manufacturing bimetal contact rivets, in which the welding bead is cut from the shaft of the contact rivet, are therefore not satisfactory.

It is an object of this invention to ensure trouble-free stamping, and to avoid adherence of the removed weld bead to the shaft of the contact rivet.

It is a further object of this invention to provide a method wherein the annular weld bead, before being cut off, is pressed flat axially, is held fast during cutting, and is rapidly cooled. Thus the weld bead becomes hard and therefore stampable, so that it can be cleanly cut off without any tendency to adhere to the shaft of the contact rivet.

It is also an object of this invention to provide apparatus using an axially-movable metallic die and, located opposite thereto, a metallic sleeve, between whose end-surfaces the weld bead is pressed flat and held fast during the cutting operation. A sleeve and a die are present initially for receiving the rivet blank. They need merely be further developed into a pressing tool.

The weld bead is preferably formed in a gap of adjustable width. The gap width may then be adapted to the contact materials and contact dimensions in such a way that the volume of the weld bead is as small as possible commensurate with trouble-free cold welding. It is an object of the invention that the weld bead becomes flat and as hard as possible.

With these and other objects in view, the invention consists in the method and in the arrangement and construction of parts as will hereinafter be more fully described, and illustrated in the accompanying drawings wherein:

FIGS. 1 to 10 each shows a partial section through apparatus for manufacturing double-contact rivets and in accordance with the teachings of the present invention, each FIG. showing different successive working phases.

Referring to the drawings in detail, the manufacture of cold-welded, stock-plated bimetal contact rivets proceeds from initial material in the form of wire; in the present example copper wire and silver wire, which are arranged to form a basic body. The copper wire 20 and silver wire 21 are each fed to the manufacturing process via feed bushes 18 or 19 respectively, located in a stationary work plate 22. This work plate 22 has six operational positions, I to VI as illustrated in FIGS. 1 to 10.

Firstly, at position I (FIG. 1), a length of silver wire 21 for the head of the contact rivet and corresponding to the subsequent head plating is introduced into cutting die 1 of a movable, cam-controlled die-holder 2. Thereafter the die-holder 2 is shifted to position II (FIG. 2) for cutting-off of the section 24 of silver wire 21 located in the cutting die 1. At position II, the cutting die 1 is aligned with the feed die 18 for the copper wire 20. A length of copper wire corresponding to the volume of the support material plus half the volume of the welding bead 23 resulting from stock-plating (FIG. 6) is now introduced into the cutting die 1. Thereafter the die-holder 2 is brought back to position 1, and there cuts off the section 25 of the copper wire 20 serving as support material.

At position I, (FIG 3), silver wire 21 is again introduced into the cutting die. The length of the introduced section 26 corresponds to the volume of the subsequent contact section of the shaft, plus half the volume of the weld bead 23 resulting from stock-plating. The die-holder 2 is now brought to position III, for cutting-off of the section 26 of silver wire 21 for stock-plating. At position III, (FIG. 4), the cutting die 1 on the one hand is aligned with a rod 6, which is guided by a die 27 in the work plate 22, and on the other hand with a transition die 3 in a movable, cam-controlled holder 5. The three wire sections 24, 25 and 26 are pushed by bar 6 into the transition die 3, whereupon bar 6 reverts to its initial position.

The die-holder 2 returns to position I for repetition of its working cycle (FIGS. 1 to 4). Simultaneously, holder 5 is moved to position IV, in which the transition die 3 and a sleeve 7 for welding the contact material and stamping, are aligned with one another. Sleeve 7 contains a buffer rod 9, against which the three wire sections 24, 25 and 26 are pushed by a pre-weld rod 8 which is horizontally movable on a working slide (not shown).

Between sleeve 7 and transition die 3 there is provided an adjustable gap 10. This gap, the position of the stop rod 9 in sleeve 7 and the path of advance of the pre-weld rod 8 are so co-ordinated that when the wire sections 24, 25 and 26 are compressed in the gap 10 between sleeve 7 and transition die 3, a weld bead 23 is formed, half from the material from section 25 of the copper wire, and half from section 26 of the silver wire, both sections being welded together. The gap between sleeve 7 and transition die 3 is kept small so that the volume of the weld bead 23 does not substantially exceed the minimum for trouble-free welding.

Simultaneously with the retraction of the pre-weld rod 8 out of the transition die 3, the stop rod 9 is also finally retracted by the length of the three wire sections 24, 25, 26 in sleeve 7 (FIG. 6). The axially-movable transition die 3 is then pushed against the sleeve, thus compressing the weld bead 23 into a flat ring. As a result of this additional deformation, in conjunction with rapid cooling of the weld bead resulting from the surface contact of the weld bead 23 with the end-surfaces of the transition die 3 and of sleeve 7, the weld bead 23 is compacted, hardened and securely held. It has been found that this flat bead can be stamped off with a clean cut, without material from the weld bead adhering to the shaft body of the contact rivet.

The weld bead 23 is cut off by a stamp rod 11 passing through the transition die 3 into the sleeve during the period when the transition die 3 is located in its pressure-applying position against bead 23 (FIG. 6). The stamp rod 11 is located on the same horizontally-movable work slide (not shown) on which is located the pre-weld rod 9. The stamp rod 11 stamps the three wire sections out of the weld bead 23 and pushes them out of the transition die 3 into sleeve 7, and then reverts to its initial position. At the same time, transition die 3 also reverts to its initial position. It thus releases the separated weld bead 23, so that the latter drops off as a ring.

Holder 5 with the empty transition die 3 now reverts to its initial position at position III, and at this point takes up the next basic body part of three wire sections (FIG. 7). At position IV, the sleeve 7 is aligned with a die 4 in holder 5. While the transition die 3 is being reloaded, the stop rod 9 pushes the two welded wire sections 25 and 26, and the silver wire section 24, not as yet welded, into die 4, the exaggerated gap between sections 24, 25 indicating this non-weld.

Thereafter the rod 6 and the stop rod 9 are retracted, and holder 5 is moved until the transition die 3 is again aligned with sleeve 7 (FIG. 8). In this position, die 4 is aligned with a die 28 in the workplate 22, and with a compression sleeve 13, located in a slide 12, which is movable between the workplate 22 and the holder 5. A ramrod 14, attached to the workslide (not shown), pushes the wire sections 24, 25, 26 against a stop rod 15 introduced into the compression sleeve 13, so that the still loose silver wire section 24 is welded to the copper wire section 25. In particular, this weld is effected in a gap between the slide 12 and the holder 5, and leads to a partially-formed contact head. Simultaneously with the welding of the head of the contact rivet, the stock-welding on the subsequent contact rivet has been completed. The ram rod 14 and the stop rod 15 then revert to their original positions.

Slide 12 now moves to position VI (FIG. 9), in which the compression sleeve 13 is aligned with a die 29 in the workplate 22. An ejector rod 16 passes through die 29 into compression sleeve 13. It remains at a position above the lower edge of the compression sleeve which corresponds to the length of the shaft of the completed contact rivet. From the opposite side, a punch 17 is applied against the compression sleeve 13, and gives the head of the contact rivet its final shape.

Thereupon the punch 17 reverts to its initial position, and the ejector rod 16 ejects the contact rivet from the compression sleeve 13 (FIG. 10), the ejector rod then reverting to its initial position.

What is claimed is:-

1. A method of manufacturing double-contact rivets which rivets consist of a support material and materials for the electrical contact providing parts different from said support material, said method comprising the steps of:-

(a) forming three cylindrical sections from supply sources, one section of which is formed from said support material and the others from electrical-contact material;
(b) aligning the three sections to form a basic body, with outer sections of electrical-contact material on either side of a central support material section;
(c) cold welding, at the adjoining ends, a first outer section of the basic body to the central section so that a weld bead is formed;
(d) pressing said weld bead in an axial direction to a substantial flat form and rapidly cooling said pressed bead;
(e) cutting-off said pressed weld bead from the remainder of the basic body;
(f) cold welding the other outer section of electrical-contact material to the central section of support material; and
(g) forming a contact head at the end of the basic body including said other outer section.

2. The method according to claim 1, wherein the cylindrical sections are wire sections cut from wire supplies.

3. The method according to claim 1, wherein the pressed weld bead is cut off by holding the bead against a plate member and moving the remainder of the basic body axially relative to the head.

4. Apparatus for manufacturing double-contact rivets which rivets consist of a support material and materials different from said support material for the electrical contact providing parts of the rivet, said apparatus comprising:-

(a) means for forming three cylindrical sections from supply sources, one section being formed from support material and the other sections being formed from electrical-contact material;
(b) means for aligning the three sections to form a basic body with outer sections of electical-contact material on either side of a central section of support material;
(c) first welding means for cold welding a first outer section of the basic body to the control section so that a weld bead is formed;
(d) means for pressing said weld bead in an axial direction;
(e) means for cutting-off said pressed weld bead from the remainder of the basic body;
(f) second welding means for cold-welding the other outer section to the central section; and
(g) means for forming a contact head at the end of the basic body including said other outer section; said pressing means comprising an axially-movable die and a sleeve member for receiving the basic body facing and aligned with said die, a gap being provided between said die and said sleeve member to permit the formation of the weld bead, the die being adapted to hold the bead against the sleeve member during bead cutting.

5. The apparatus according to claim 4, wherein the cutting means includes a rod for axial movement of the remainder of the basic body into the sleeve member relative to the bead.

6. The apparatus according to claim 4, wherein means are provided to vary the width of the gap between the die and the sleeve member.

* * * * *